United States Patent Office 3,218,347
Patented Nov. 16, 1965

3,218,347
HALOPHENYL BIS-CARBONATES
Joseph Willard Baker, Kirkwood, Mo., assignor to
Monsanto Company, a corporation of Delaware
No Drawing. Filed May 13, 1963, Ser. No. 280,101
7 Claims. (Cl. 260—463)

This invention relates to a novel class of substituted phenyl carbonates. More particularly, this invention is concerned with a class of new organic compounds which are halophenyl bis-carbonates. Such carbonates are found to possess useful and unexpected biological activity.

The novel compounds of this invention have the general formula,

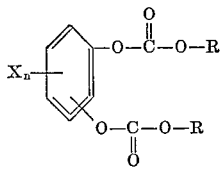

wherein R is selected from the group consisting of phenyl and —$C_aH_bY_m$; $n$ is an integer from 1 to 4; $m$ is an integer from 0 to 3; $a$ is an integer from 1 to 4; X and Y are each selected from the group consisting of chlorine and bromine, the total number of atoms represented by X and Y being at least 2; and $b$ is equal to $2a$ plus 1 minus $m$.

As illustrative of —$C_aH_bY_m$, but not limitative thereof, are methyl, ethyl, propyl, butyl, chloromethyl, 2-chloroethyl, 2-chloropropyl, 3-chloropropyl, 2-chlorobutyl, 3-chlorobutyl, 4-chlorobutyl, bromomethyl, 2-bromoethyl, 2-bromopropyl, 3-bromopropyl, 2-bromobutyl, 3-bromobutyl, 4-bromobutyl, 2,3-dichloropropyl, 2,3-dibromobutyl, 2,2,2-trichloroethyl, etc., and the various alkyl and haloalkyl isomers containing up to 4 carbon atoms.

This novel class of compounds can be prepared by causing at least two mols of an alkyl, haloalkyl or phenyl chloroformate to react with one mol of a halogenated dihydric phenol to produce the desired halophenyl bis-carbonate. In such reactions, it is preferred to add a tertiary amine to the reaction mixture to serve as an acceptor for the hydrogen chloride formed during the reaction. Examples of tertiary amines which can be used are quinaldine, triethylamine, dimethylaniline, diethylaniline, pyridine and the like. Examples of reactions utilizing an amine acceptor and yielding a halophenyl bis-carbonate are as follows:

(a)

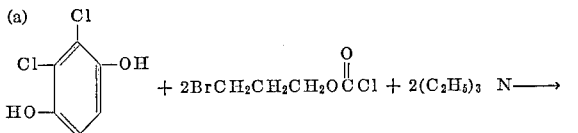

(b)

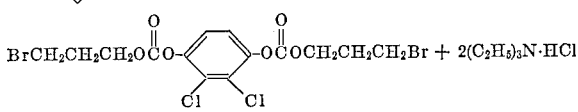

In practicing preparations such as those of Equations $a$ and $b$, it is also preferred to use an inert organic solvent as the reaction medium. Among the suitable solvents are benzene, toluene, xylene, hexane, heptane, octane, propyl ether, ethyl ether, tetrahydrofuran, dioxane and the like. The reaction temperatures employed in preparing the new compounds will depend upon the particular reactants utilized to obtain a desired end product.

It should be noted that, although both are preferred, neither the tertiary amine nor the inert organic solvent are essential to the preparation of the compounds of this invention. In absence of such amine, the hydrogen chloride which forms during the reaction can be boiled off.

The invention will be more fully understood by reference to the following examples which are set forth herein solely for the purpose of illustration and are not to be construed as limiting the scope of the present invention.

Example 1

A suitable reaction vessel is charged with 12.4 grams (0.05 mol) of tetrachlorocatechol, 15.0 grams (0.11 mol) of n-butyl chloroformate and 225 ml. of ether. The mixture is stirred at a temperature of about 10° C. during the dropwise addition of 11.2 grams (0.11 mol) of triethylamine in 25 ml. of ether. The resulting mixture is then stirred and heated at reflux for about three hours. Said mixture is cooled to room temperature and filtered to remove insoluble by-products. The solvent is evaporated from the filtrate to yield the crude product. Said product is then recrystallized from cold pentane, after decolorization with activated carbon, to yield 18.0 grams of tetrachloro-o-phenylene bis(butyl carbonate), M.P. 19–20° C. Analysis shows 42.9% carbon, 3.97% hydrogen, and 31.8% chlorine, as against calculated values of 42.9%, 4.05% and 31.7%, respectively, for $C_{16}H_{18}Cl_4O_6$.

When 10.7 grams (0.05 mol) of 3,4,5-trichlorocatechol is employed in place of the tetrachlorocatechol, the product obtained is 3,4,5-trichloro-o-phenylene bis(butyl carbonate).

Example 2

A suitable reaction vessel is charged with 12.4 grams (0.05 mol) of tetrachlorocatechol, 10.8 grams (0.1 mol) of ethyl chloroformate and 250 ml. of ether. The mixture is stirred at a temperature of about 10–15° C. during the dropwise addition of 10.1 grams (0.1 mol) of triethylamine in 25 ml. of ether. The resulting mixture is then stirred and heated at reflux temperature for about three hours. Said mixture is cooled to room temperature and filtered to remove any insoluble material. The solvent is evaporated from the filtrate to yield the crude product. Said product is then recrystallized from Skellysolve B (an essentially n-hexane solvent having a boiling range of 60–70° C.) and then from methylcyclohexane to yield 13.0 grams of tetrachloro-o-phenylene bis(ethyl carbonate), M.P. 90–91° C. Analysis shows 36.4% carbon, 2.60% hydrogen and 36.2% chlorine, as against calculated values of 36.8%, 2.57% and 36.2%, respectively, for $C_{12}H_{10}Cl_4O_6$.

When 21.2 grams (0.1 mol) of 2,2,2-trichloroethyl chloroformate is employed in place of the ethyl chloroformate, the product obtained is tetrachloro-o-phenylene bis(2,2,2-trichloroethyl carbonate).

Example 3

A suitable reaction vessel is charged with 17.9 grams (0.1 mol) of 4,6-dichlororesorcinol, 28.6 grams (0.2 mol) of 2-chloroethyl chloroformate and 200 ml. of ether. The mixture stirred at a temperature of about 5–10° C. during the dropwise addition of 20.2 grams (0.2 mol) of triethylamine in 25 ml. of ether. The resulting mixture is then stirred and heated at reflux temperature for about three hours. Said mixture is cooled to room temperature and filtered to remove any insoluble material. The solvent is evaporated from the filtrate to yield the crude product. Said product is then recrystallized from methylcyclohexane, after decolorization with activated carbon, to yield 23.6 grams of 4,6-dichloro-m-phenylene bis(2-chloroethyl carbonate), M.P. 87–88° C. Analysis shows 36.5% carbon, 2.80% hydrogen and 36.2% chlorine, as against calculated values of 36.8%, 2.57% and 36.2%, respectively, for $C_{12}H_{10}Cl_4O_6$.

When 31.3 grams (0.2 mol) of phenyl chloroformate is employed in place of the 2-chloroethyl chloroformate, the product obtained is 4,6 - dichloro - m - phenylene bis(phenyl carbonate).

*Example 4*

A suitable reaction vessel is charged with 21.2 grams (0.05 mol) of tetrabromocatechol, 14.3 grams (0.1 mol) of 2-chloroethyl chloroformate and 300 ml. of ether. The mixture is stirred at a temperature of about 10–15° C. during the dropwise addition of 10.1 grams (0.1 mol) of triethylamine in 35 ml. of ether. The resulting mixture is then stirred and heated at reflux temperature for about three hours. Said mixture is cooled to room temperature and filtered to remove any insoluble material. The solvent is evaporated from the filtrate, and the crude product is decolorized with activated carbon. Said product is then recrystallized several times from methylcyclohexane to yield 5.8 grams of tetrabromo-o-phenylene bis(2-chloroethyl carbonate), M.P. 118–119° C. Analysis shows 22.8% carbon, 1.40% hydrogen and 11.2% chlorine, as against calculated values of 22.6%, 1.26% and 11.1%, respectively, for $C_{12}H_8Br_4Cl_2O_6$.

When 28.0 grams (0.1 mol) of 2,3-dibromopropyl chloroformate is employed in place of the 2-chloroethyl chloroformate, the product obtained is tetrabromo-o-phenylene bis(2,3-dibromopropyl carbonate).

*Example 5*

A suitable reaction vessel is charged with 12.4 grams (0.05 mol) of tetrachlorohydroquinone, 14.3 grams (0.1 mol) of 2-chloroethyl chloroformate and 350 ml. of ether. The mixture is stirred at a temperature of about 10–15° C. during the dropwise addition of 10.1 grams (0.1 mol) of triethylamine in 15 ml. of ether. The resulting mixture is then stirred and heated at reflux temperature for about three hours. Said mixture is cooled to room temperature and filtered to remove any insoluble material. The solvent is evaporated from the filtrate, and the crude product is decolorized with activated carbon. Said product is recrystallized twice from methylcyclohexane to yield 16.3 grams of tetrachloro-p-phenylene bis(2-chloroethyl carbonate), M.P. 125–127° C. Analysis shows 31.1% carbon, 1.60% hydrogen and 46.4% chlorine, as against calculated values of 31.3%, 1.75% and 46.2%, respectively, for $C_{12}H_8Cl_6O_6$.

When 7.2 grams (0.05 mol) of 3-chlorohydroquinone is employed in place of the tetrachlorohydroquinone, the product obtained is 3-chloro-p-phenylene bis(2-chloroethyl carbonate).

*Example 6*

A suitable reaction vessel is charged with 12.4 grams (0.05 mol) of tetrachlorocatechol, 10.5 grams (0.11 mol) of methyl chloroformate and 200 ml. of ether. The mixture is stirred at a temperature of about 10° C. during the dropwise addition of 11.2 grams (0.11 mol) of triethylamine in 25 ml. of ether. The resulting mixture is then stirred and heated at reflux temperature for about three hours. Said mixture is cooled to room temperature and filtered to remove any insoluble material. The solvent is evaporated from the filtrate, and the crude product is decolorized with activated carbon. Said product is recrystallized twice from methylcyclohexane to yield 15.0 grams of tetrachloro-o-phenylene bis(methyl carbonate), M.P. 121–122° C. Analysis shows 33.2% carbon, 1.91% hydrogen and 39.3% chlorine, as against calculated values of 33.0%, 1.66% and 39.0%, respectively, for $C_{10}H_6Cl_4O_6$.

When 9.0 grams (0.05 mol) of 3,5-dichlorocatechol is employed in place of the tetrachlorocatechol, the product obtained is 3,5-dichloro-o-phenylene bis(methyl carbonate).

*Example 7*

A suitable reaction vessel is charged with 7.4 grams (0.03 mol) of tetrachlorocatechol, 8.5 grams (0.06 mol) of 2-chloroethyl chloroformate and 200 ml. of ether. The mixture is stirred at a temperature of about 5–15° C. during the dropwise addition of 6.1 grams (0.06 mol) of triethylamine in 20 ml. of ether. The resulting mixture is then stirred and heated at reflux temperature for about three hours. Said mixture is cooled to room temperature and filtered to remove any insoluble material. The solvent is evaporated from the filtrate, and the crude product is decolorized with activated carbon. Said product is recrystallized twice from methylcyclohexane (plus a small amount of toluene) to yield 4.3 grams of tetrachloro-o-phenylene bis(2-chloroethyl chloroformate), M.P. 69–71° C. Analysis shows 31.0% carbon, 1.90% hydrogen and 46.1% chlorine, as against calculated values of 31.3%, 1.75% and 46.2%, respectively, for $C_{12}H_8Cl_6O_6$.

The products of the present invention are useful as microbiocides adapted to be employed for the control of bacterial and fungal organisms. In a representative test, tetrachloro-o-phenylene bis(2-chloroethyl carbonate) is active against *Staphylococcus aureus* at a dilution in excess of one part per million, and against *Aspergillus niger* at a dilution in excess of one part per ten thousand. A representative test for tetrachloro-o-phenylene bis (methyl carbonate) shows activity against *Salmonella typhosa* at a dilution in excess of one part per one hundred thousand.

While this invention has been described with respect to certain specific embodiments, it is not so limited. It is to be understood that variations and modifications thereof may be made without departing from the spirit and scope of this invention.

The embodiments of the invention in which an exclusive property or privilege is claimed are defined as follows:

1. A compound of the formula,

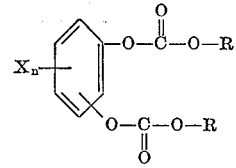

wherein R is selected from the group consisting of phenyl and $—C_aH_bY_m$; $n$ is an integer from 1 to 4; $m$ is an integer from 0 to 3; $a$ is an integer from 1 to 4; X and Y are each selected from the group consisting of chlorine and bromine, the total number of atoms represented by X and Y being at least 2; and $b$ is equal to $2a$ plus 1 minus $m$.

2. A compound of the formula,

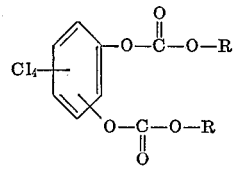

where R is alkyl containing from 1 to 4 carbon atoms.

3. A compound of the formula,

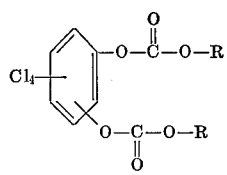

where R is chloroalkyl containing from 1 to 4 carbon atoms.
4. Tetrachloro-o-phenylene bis(methyl carbonate).
5. Tetrachloro - o - phenylene bis(2-chloroethylcarbonate).
6. Teterachloro-o-phenylene bis(ethyl carbonate).
7. Tetrabromo - o - phenylene bis(2 - chloroethyl carbonate).

References Cited by the Examiner
UNITED STATES PATENTS

| | | | |
|---|---|---|---|
| 2,385,932 | 10/1945 | Muskat et al. | 260—463 |
| 2,455,652 | 12/1948 | Bralley et al. | 260—463 |
| 2,510,025 | 5/1950 | Moyle | 260—463 |
| 2,567,987 | 9/1951 | Baumgartner | 260—463 |
| 2,754,229 | 7/1956 | Fredenburg et al. | 260—463 |

FOREIGN PATENTS 950,544   3/1949   France.

OTHER REFERENCES

Beilstein, "Handbach der Organische Chemie," volume 6, page 196 (1923).
Melnikov, J. Prakt. Chem., volume 128, pages 233–238 (1930).

CHARLES B. PARKER, *Primary Examiner.*